US010763656B2

(12) United States Patent
Miller

(10) Patent No.: US 10,763,656 B2
(45) Date of Patent: *Sep. 1, 2020

(54) TRENCHING METHODS AND APPARATUS

(71) Applicant: CertusView Technologies, LLC, Palm Beach Gardens, FL (US)

(72) Inventor: Daniel Paul Miller, Brush Prairie, WA (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,936

(22) Filed: Oct. 16, 2015

(65) Prior Publication Data

US 2016/0201291 A1    Jul. 14, 2016

Related U.S. Application Data

(63) Continuation of application No. 13/796,391, filed on Mar. 12, 2013, now Pat. No. 9,203,226, which is a
(Continued)

(51) Int. Cl.
*H02G 1/06* (2006.01)
*H02G 9/00* (2006.01)
(Continued)

(52) U.S. Cl.
CPC ............. *H02G 9/00* (2013.01); *E02F 3/8816* (2013.01); *E02F 5/02* (2013.01); *E02F 5/08* (2013.01);
(Continued)

(58) Field of Classification Search
USPC ....... 405/154.1, 155, 179, 180; 37/352, 355, 37/142.5; 404/90, 91, 94; 125/13.01,
(Continued)

(56) References Cited

U.S. PATENT DOCUMENTS 2,754,101 A    7/1956    Nutt et al.
3,027,647 A    4/1962    Shaffer
(Continued)

FOREIGN PATENT DOCUMENTS

CL    46530    4/2007
DE    19715213 A1    10/1998
(Continued)

OTHER PUBLICATIONS

Combined Search and Examination Report dated Nov. 6, 2014 from GB Application No. GB1408577.3.
(Continued)

*Primary Examiner* — Sean D Andrish
(74) *Attorney, Agent, or Firm* — Smith Baluch LLP

(57) ABSTRACT

Methods and apparatus for cutting a trench (e.g., for a fiber optic cable or wire conductors) in an existing covering surface (e.g., a road surface). Debris from the cut trench is evacuated (e.g., vacuumed) from the trench as the trench is cut. The trench may be backfilled using a flowable composition. In one example, the flowable composition rigidifies after being flowed into the trench, and thereafter is substantially impermeable (e.g., having a hydraulic permeability of less than 0.0000001 cm/s upon drying), non-compressible and/or non-expanding.

27 Claims, 6 Drawing Sheets

Related U.S. Application Data continuation of application No. 12/889,196, filed on Sep. 23, 2010, now Pat. No. 8,480,332.

(60) Provisional application No. 61/244,954, filed on Sep. 23, 2009.

(51) Int. Cl.
| | | |
|---|---|---|
| *E02F 5/10* | (2006.01) | |
| *E02F 3/88* | (2006.01) | |
| *E02F 5/08* | (2006.01) | |
| *E02F 5/12* | (2006.01) | |
| *E02F 5/02* | (2006.01) | |

(52) U.S. Cl.
CPC .............. *E02F 5/10* (2013.01); *E02F 5/101* (2013.01); *E02F 5/12* (2013.01); *H02G 1/06* (2013.01)

(58) Field of Classification Search
USPC ..... 125/13.02, 13.03, 14, 15; 299/39.2, 39.3
See application file for complete search history.

(56) References Cited

U.S. PATENT DOCUMENTS

| | | | |
|---|---|---|---|
| 3,585,980 | A | 6/1971 | Mellor |
| 4,316,509 | A | 2/1982 | Hallum |
| 4,329,083 | A | 5/1982 | Parkinson |
| 4,900,094 | A | 2/1990 | Sergeant |
| 5,114,268 | A | 5/1992 | Marcato |
| 5,167,215 | A | 12/1992 | Harding, Jr. |
| D344,035 | S | 2/1994 | Hatfield et al. |
| 5,596,822 | A | 1/1997 | Desmarais et al. |
| 5,879,109 | A | 3/1999 | Finzel et al. |
| 5,988,294 | A | 11/1999 | Hubscher |
| 6,076,628 | A | 6/2000 | Desmarais et al. |
| 6,099,080 | A | 8/2000 | Hirashita et al. |
| 6,349,488 | B1 | 2/2002 | Mason |
| 6,371,691 | B1 | 4/2002 | Finzel et al. |
| 6,457,267 | B1 | 10/2002 | Porter et al. |
| 6,503,025 | B1 | 1/2003 | Miller |
| 6,807,355 | B2 | 10/2004 | Dofher |
| 7,050,683 | B2 | 5/2006 | Dofher |
| 7,225,803 | B2 | 6/2007 | Boyadjieff |
| 8,061,344 | B2 | 11/2011 | Dofher |
| 8,480,332 | B2 | 7/2013 | Miller |
| 9,203,226 | B2 | 12/2015 | Miller |
| 2002/0061231 | A1 | 5/2002 | Finzel |
| 2005/0000202 | A1 | 1/2005 | Scordilis |
| 2005/0191113 | A1 | 9/2005 | Frazier |
| 2007/0089329 | A1 | 4/2007 | Sigmund |
| 2007/0096536 | A1 | 5/2007 | Walker et al. |
| 2008/0298755 | A1 | 12/2008 | Caplan |
| 2010/0071596 | A1 | 3/2010 | Konczak |
| 2011/0016754 | A1 | 1/2011 | Ruhl et al. |
| 2012/0048148 | A1 | 3/2012 | Konczak |
| 2012/0195694 | A1 | 8/2012 | Konczak |
| 2014/0334878 | A1 | 11/2014 | Miller |

FOREIGN PATENT DOCUMENTS

| | | |
|---|---|---|
| EP | 0869223 | 10/1998 |
| EP | 2246485 | 11/2010 |
| FR | 2773565 | 7/1999 |
| GB | 2213228 | 8/1989 |
| GB | 2468785 | 9/2010 |
| JP | 62-249108 | 10/1987 |
| JP | 08081913 | 3/1996 |
| JP | 10280315 | 10/1998 |
| JP | 2001107314 | 4/2001 |
| KR | 200364313 | 10/2004 |
| KR | 1020040096985 | 11/2004 |
| KR | 1020060040419 | 5/2006 |
| KR | 100714162 | 5/2007 |
| KR | 2020080005301 | 11/2008 |
| KR | 20090014562 | 2/2009 |
| WO | WO02065182 | 8/2002 |
| WO | WO2006048686 | 5/2006 |
| WO | WO2008048717 | 4/2008 |
| WO | WO2011093764 | 8/2011 |
| WO | WO2012102659 A1 | 8/2012 |

OTHER PUBLICATIONS

Examination Report dated Nov. 6, 2014 from GB Application No. GB1210281.
Examination Report dated Dec. 2, 2013 for GB Application No. 1210281.0.
http://www.yourdictionary.com/alongside, 2 pages.
International Search Report and Written Opinion dated Jun. 20, 2011, Korean Intellectual Property Office, Republic of Korea, 8 pages.
Notice of Allowance dated May 31, 2013 from U.S. Appl. No. 13/796,391.
Notice of Allowance dated Aug. 5, 2015 from U.S. Appl. No. 13/796,391.
Office Action dated Jan. 10, 2013 from U.S. Appl. No. 12/572,260.
Office Action dated Jan. 20, 2015 from Mexican Patent Application No. MX/a/2012/003509 (w/English translation).
Office Action dated Feb. 23, 2015 from U.S. Appl. No. 13/796,391.
Office Action dated Apr. 4, 2013 from U.S. Appl. No. 12/889,196.
Office Action dated Apr. 26, 2013 from U.S. Appl. No. 12/889,196.
Office Action dated May 14, 2013 from U.S. Appl. No. 12/889,196.
Office Action dated Jun. 2, 2014 from U.S. Appl. No. 13/796,391.
Office Action dated Jun. 5, 2013 from Colombian Application No. 12-063156.
Office Action dated Aug. 16, 2013 from U.S. Appl. No. 13/796,391.
Office Action dated Aug. 25, 2015 from U.S. Appl. No. 14/204,462.
Office Action dated Sep. 29, 2015 from Canadian Application No. 2,774,988.
Office Action dated Oct. 9, 2014 from U.S. Appl. No. 13/796,391.
Office Action dated Oct. 23, 2014 from Dominican Republic Application No. P2012-0079.
Office Action dated Nov. 29, 2013 from U.S. Appl. No. 13/796,391.
Office Action dated Dec. 3, 2013 from Columbian Application No. 12-036.156.
Nielsen et al., co-pending U.S. Appl. No. 2014-0334878, published Nov. 13, 2014.
Office Action dated Apr. 26, 2016 from Canadian Application No. 2,774,988.
Office Action dated Apr. 19, 2016 from U.S. Appl. No. 14/204,462.
Office Action dated Jun. 6, 2016 from Peruvian Application No. 363-2012/DIN (w/English language translation).
English language translation of Office Action dated Jun. 6, 2016 from Chilean Application No. 201200729.
Second Examination of Patentability dated Dec. 19, 2016 from Peruvian Application No. 000363-2012 w/English Translation.
Resolution of Rejection dated Dec. 16, 2016 from Chilean Patent Application No. 201200729 w/English Translation.
Office Action dated Jan. 19, 2017 from U.S. Appl. No. 14/204,462.
Supplementary Partial European Search Report dated Nov. 7, 2016 from European Application No. EP 14 77 3108.
Office Action dated Oct. 12, 2017 from Canadian Application No. 2,962,694.
Office Action dated Aug. 11, 2017 from U.S. Appl. No. 14/204,462.
Office Action dated Feb. 28, 2018 from U.S. Appl. No. 14/204,462.
Office Action dated Nov. 28, 2018 from U.S. Appl. No. 15/192,6904, 9 pages.

TRENCHING METHODS AND APPARATUS

CROSS-REFERENCE TO RELATED APPLICATIONS

The present application claims the benefit, under 35 U.S.C. § 120, as a continuation (CON) of U.S. Non-provisional Ser. No. 13/796,391, filed Mar. 12, 2013, entitled "Laying and Protecting cable into Existing Covering Surfaces."

U.S. Non-provisional Ser. No. 13/796,391, filed Mar. 12, 2013, claims the benefit, under 35 U.S.C. § 120, as a continuation (CON) of U.S. Non-provisional Ser. No. 12/889,196, filed Sep. 23, 2010, entitled "Laying and Protecting cable into Existing Covering Surfaces."

U.S. Non-provisional Ser. No. 12/889,196, filed Sep. 23, 2010, in turn claims the benefit, under 35 U.S.C. § 119(e), of U.S. Provisional Ser. No. 61/244,954, filed Sep. 23, 2009, entitled "Laying and Protecting Cable into Existing Covering Surfaces."

Each of the above-identified applications is hereby incorporated herein by reference.

BACKGROUND

Problems are encountered when attempting to lay the "last mile" of underground cables such as, for example, a fiber optic cable or an electrical cable. The problem is accentuated in urban areas due to the dense build-out of the surrounding area, traffic congestions, and on-going road repairs occurring in urban areas.

Such cables may or may not be enclosed in a pipe or a conduit depending on customer needs. One or more cables may be enclosed in such a pipe or conduit depending on customer needs.

Prior systems used for the construction of underground paths for the insertion of underground cable were cumbersome. For example, operators had to make multiple passes to cut a slot prior to adequate insertion of the cable.

SUMMARY

An efficient system and method for laying the "last mile" of underground cables creating minimal disruption to property owners or less impact to the neighborhood is needed.

The following steps are carried out in the system and method. First, cut and immediately evacuate a void in the existing covering surface. Next, lay or apply cable(s) (cable, ducts and/or conduits) into the void (i.e. underground). Then, flow a non-shrinking composition into a portion of the void around the cable to fill a portion of the void. Upon rigidification the cable is encased in the void by the non-shrinking composition. Last, apply a topping material to the exposed surface of the composition in such volume as to fill any remaining portion of the void. This seals the void now filled with an underground cable line as encased by the composition.

DETAILED DESCRIPTION

Figure 1:
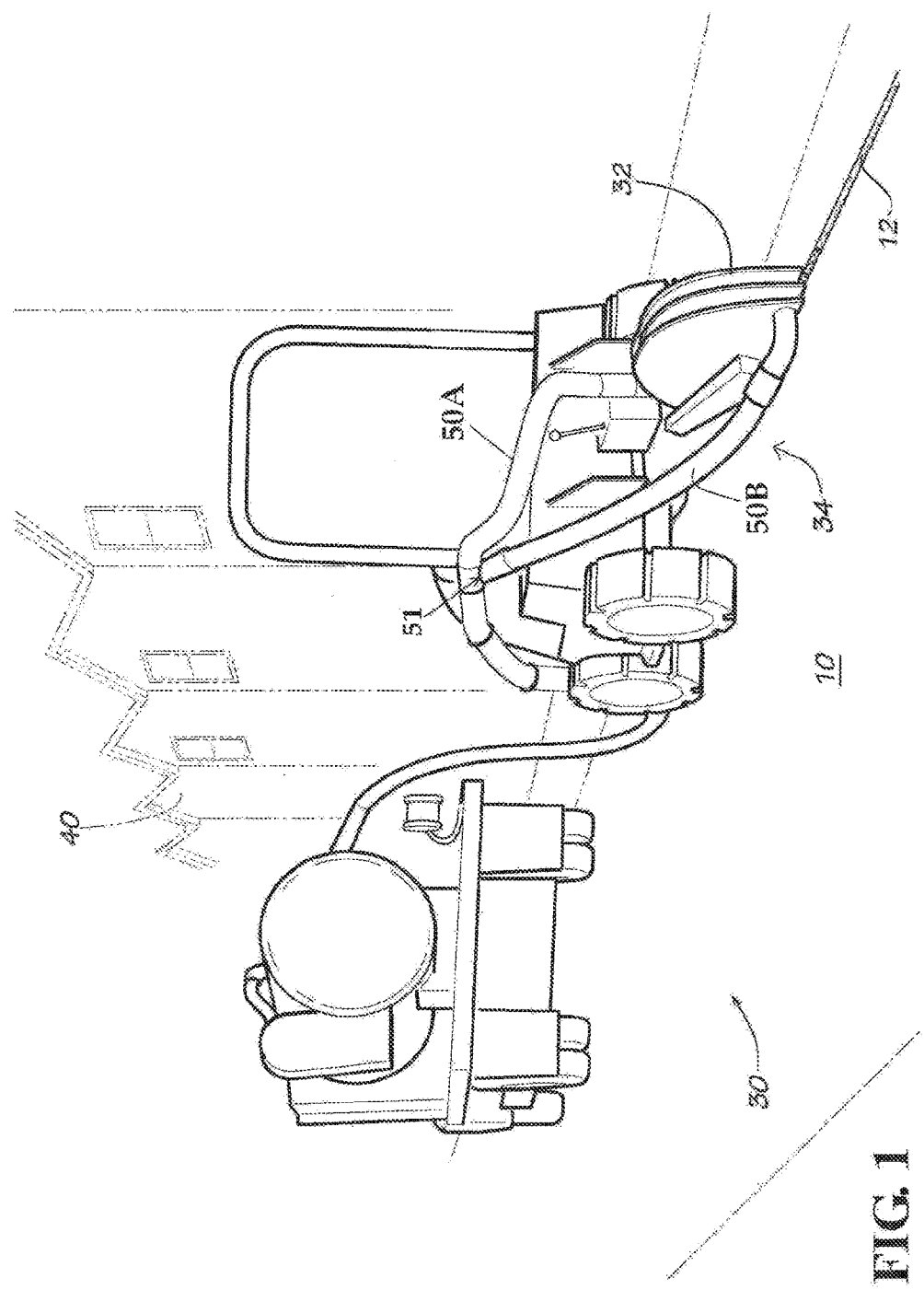
FIG. 1 is an elevation view of a cutting and evacuating machine making a channel through the covering surface in a neighborhood.
Figure 2:
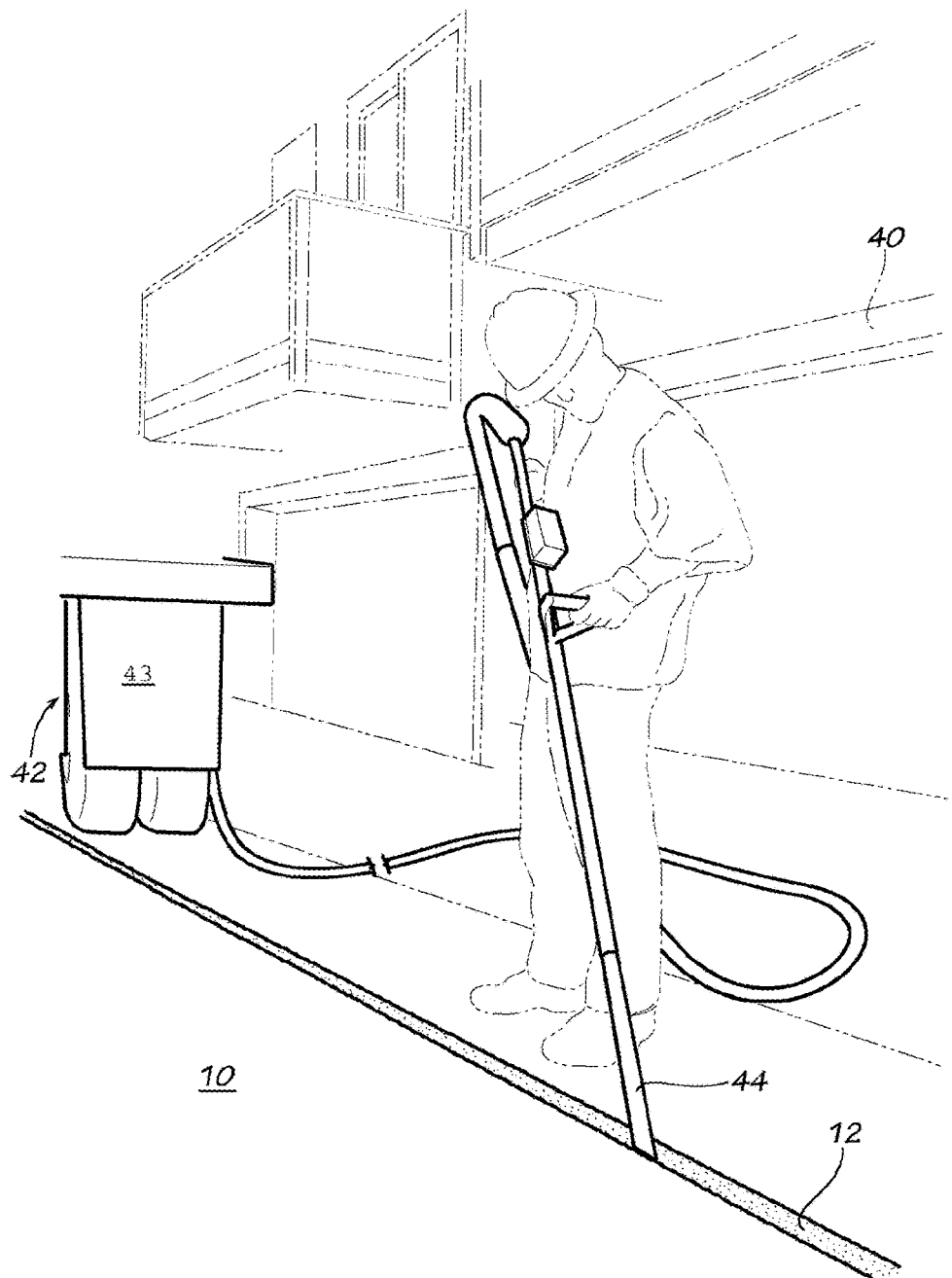
FIG. 2 is an elevation view of a grouting machine flowing grout into the channel of the covering surface within a neighborhood.
Figure 3:
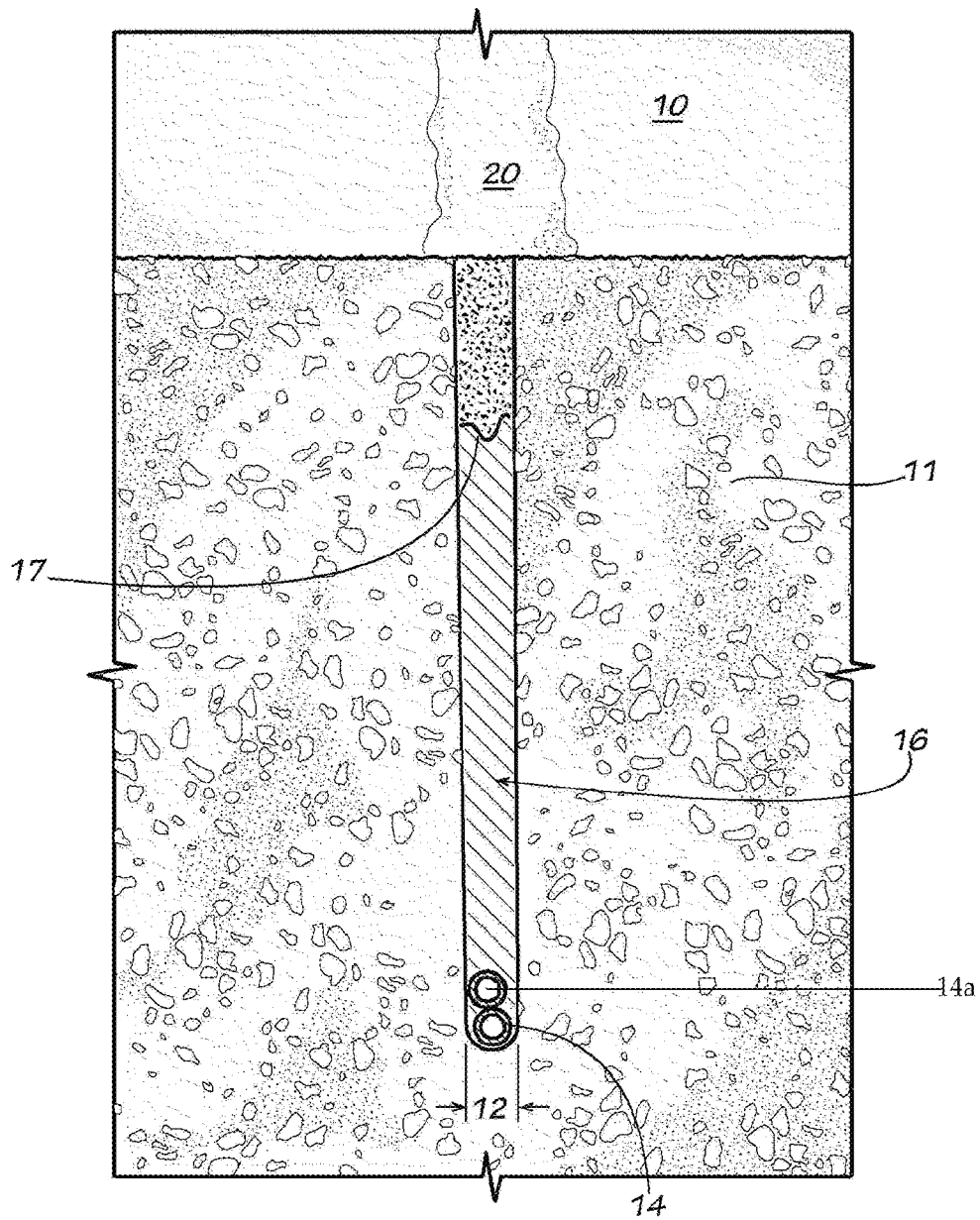
FIG. 3 is a sectional view of a channel through a covering surface filled with cables, grout and topping material.

Referring to FIG. 1, an underground cable line (FIG. 3) may be constructed or installed into an existing covering surface 10. The covering surface 10 is normally pre-existing and hence the challenge for construction of the underground cable line. Such existing covering surface 10 could be, but is not limited to, pavement, paving, concrete, asphalt, blacktop, cobblestone, brick, other road base, grade or surface, or the like, or any combination of the foregoing (e.g. combination of asphalt laid over concrete).

Figure 4:
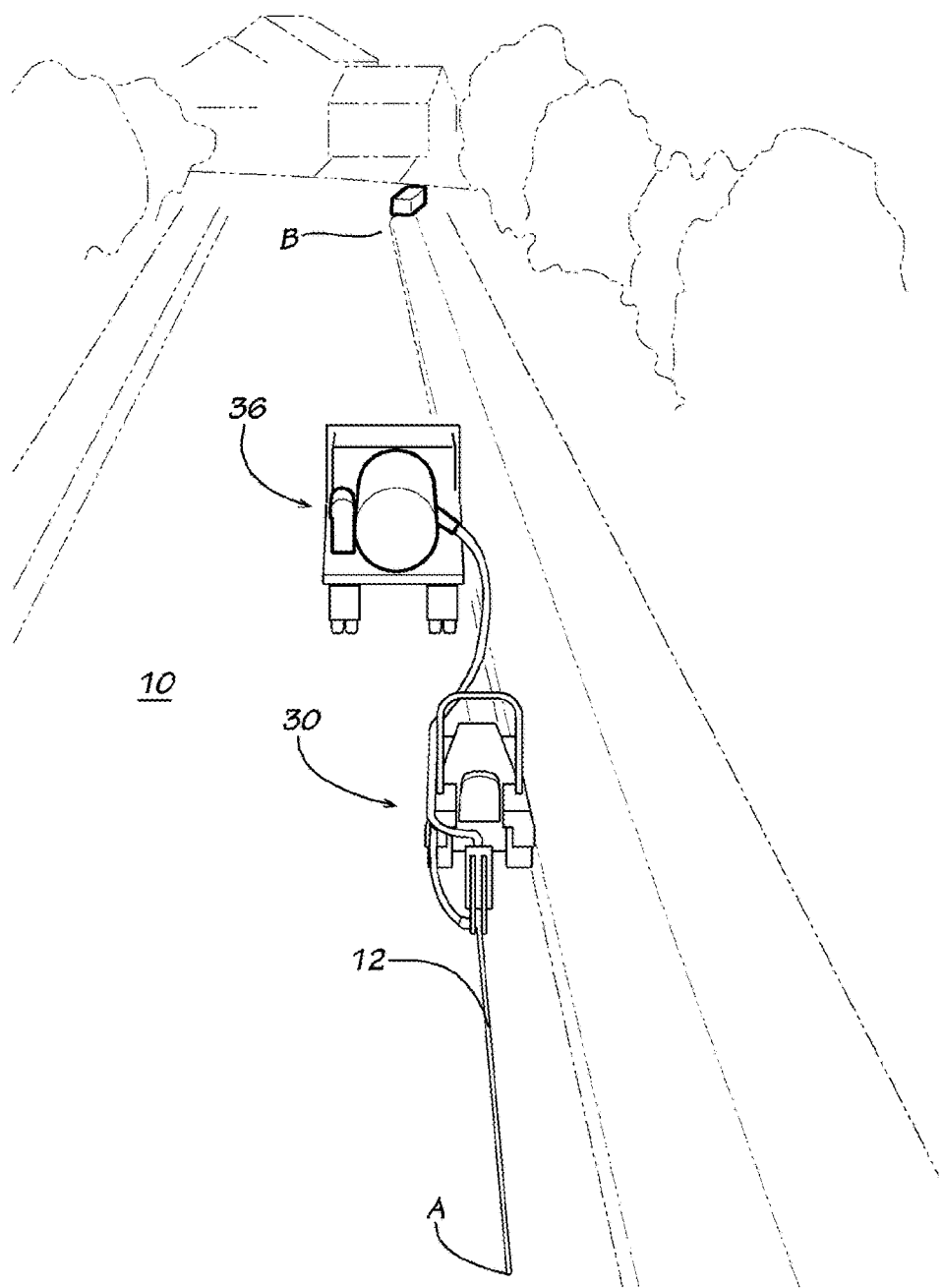
FIG. 4 is a perspective view of one embodiment cutting and evacuating a void in an existing covering surface within a neighborhood.

To construct the underground cable line, operator(s) cut and evacuate a void, channel or passage 12 into the existing covering surface 10 (having sub-surface 11). It is advantageous to avoid making multiple passes (as done in prior systems) in order to cut the void 12. Therefore the void 12 is cut in one and only one pass or swath from, referring to FIG. 4, a first position or starting point A to a second position or finishing point B (which may, for example, be separated by some kilometers or in another example by 45.72 meters (150 feet), i.e., cut in one and only one pass by a distance more than a few centimeters). Some of the advantages to using this technique include that the base is not disturbed as with multiple passes; less time is consumed in construction the void; the void is constructed with a simple uniform cut. Therefore the technique of cutting the void 12 in one and only one pass is quite advantageous.

Figure 5:
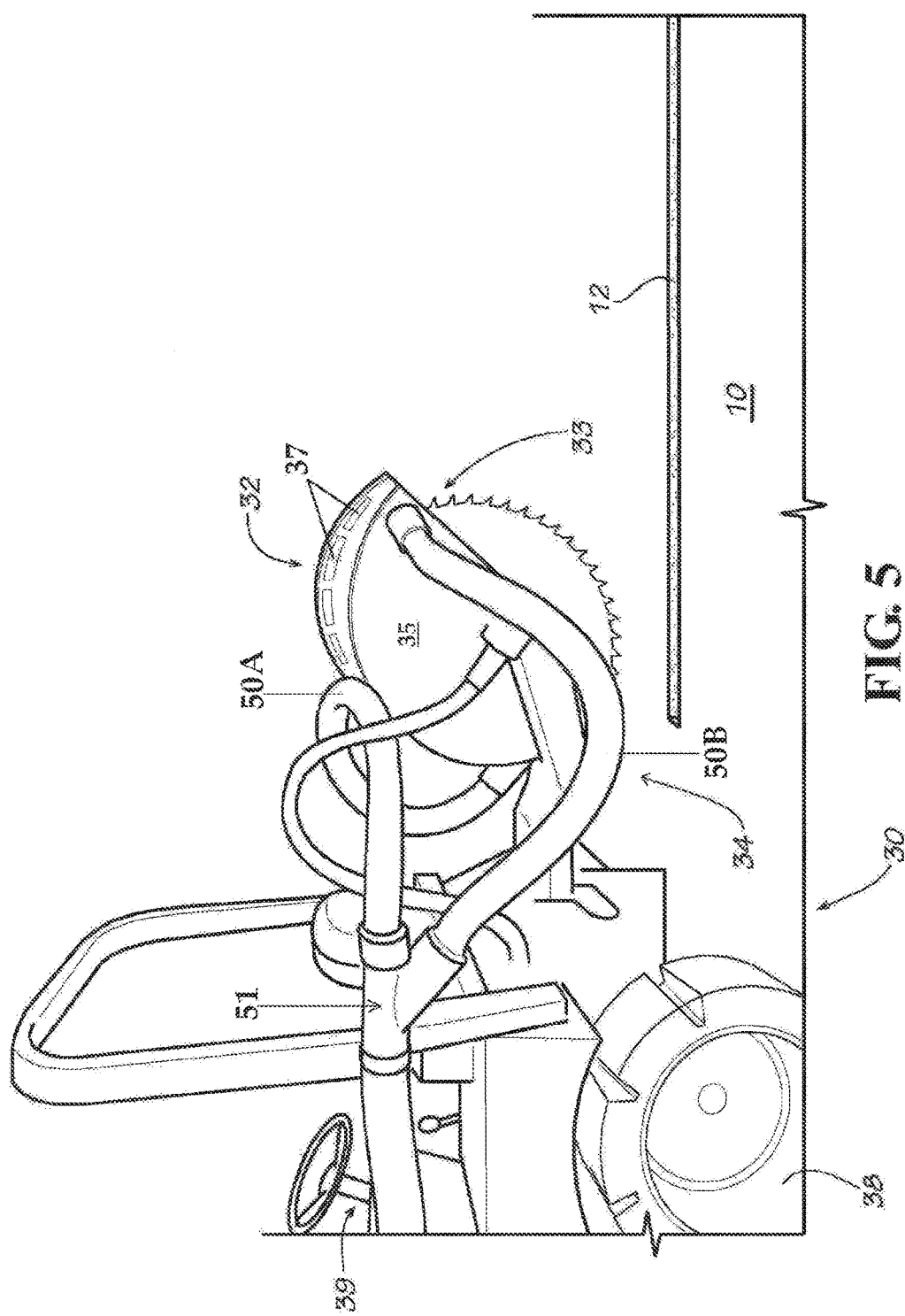
FIG. 5 is an elevation view of an embodiment of a portable cutting and evacuating machine with the blade of the cutter raised for inspection or transport.

One embodiment of a machine 30 which may be used to cut and evacuate in one and only one swath includes, for example, a cutter 32 with a narrow rotating blade 33 (FIG. 5) that will cut the existing covering surface 10 leaving a void 12 behind. The machine 30 is portable via, for example, wheels 38 (FIG. 5), and has an operator control station 39. Operator control station 39 (FIG. 5) includes a seat for the operator and a steering wheel to turn the machine 30. Each of the wheels 38 has an inner sidewall, an outer sidewall, and a circumferential area that contacts the covering surface 10. The circumferential area of each of the wheels 38 may include a grooved portion with a groove extending from the outer sidewall to the inner sidewall and may also include a portion free of grooves that is substantially free of tread. Outer sidewall and inner sidewall of wheels 38 may be substantially planar.

Accompanying the cutter 32, the machine 30 also immediately cleans or evacuates the void 12 such as by blowing, vacuuming, and/or sweeping the void 12. In the embodiment shown, a vacuum system 34 (e.g., including two evacuation ducts 50A and 50B and a Y-duct 51) accompanies the cutter 32 and is partially mounted to the machine 30. Preferably, but not limited to, the vacuum system 34 is in juxtaposition with respect to the cutter 32 and is mounted upper-lower, respectively and in relation to the cutter 32 such that the step of vacuuming occurs concurrent with the step of cutting the void 12. The vacuum system 34 may be connected to an independent portable vacuuming system 36 (FIG. 4) mounted to a vehicle and connected via a Y-duct 51.

Figure 6:
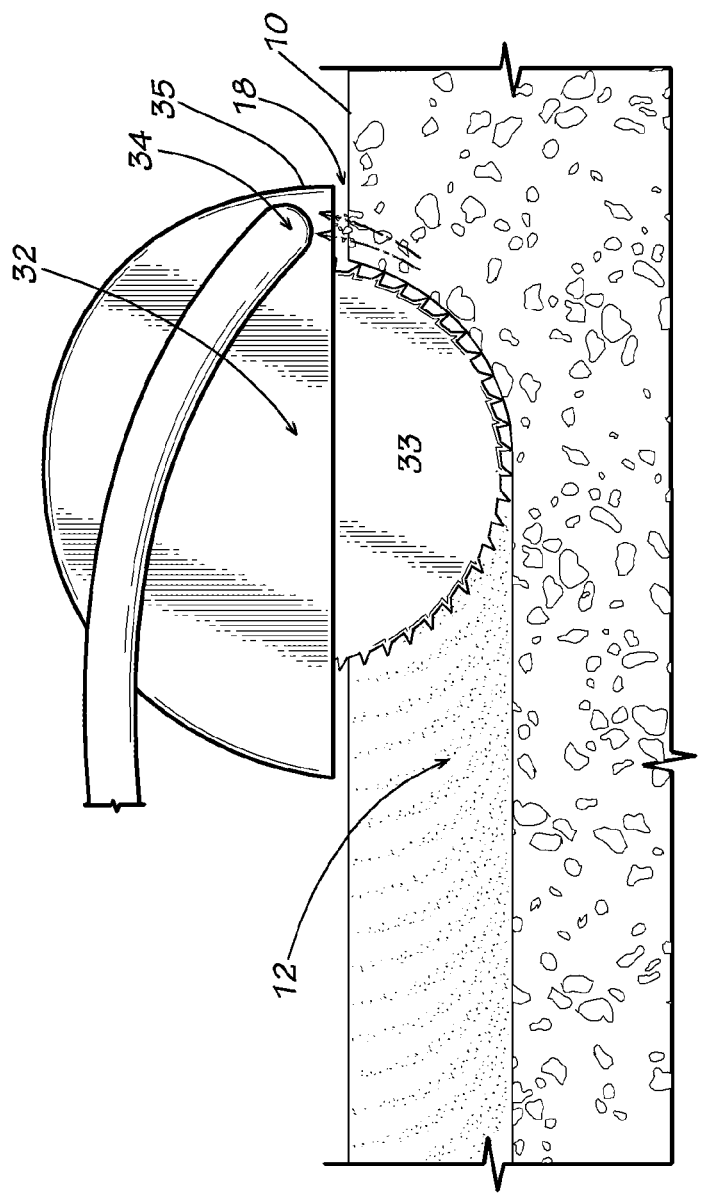
FIG. 6 is a schematic view in section of an embodiment of a cutter and vacuum system cutting and evacuating a void which is being cut into an existing covering surface.

In cutting the void 12 the action of the cutter 32 cuts and moves material and/or soil from the covering surface 10. this creates a stream or volume of debris (designated by arrows 18, FIG. 6) that generally has momentum from and travels in the direction of the cutter 32 (at least initially). The vacuum system 34 in juxtaposition to the cutter 32 concurrently, immediately and directly suctions the stream of debris 18 (preferably all or at least substantially all of the debris 18) through an inlet shroud 35 that includes one or more vents 37 and which overlaps the path of the stream of debris 18. This prevents the stream of debris 18 (containing cuttings, remnants, and/or excavated matter from the covering surface 10) from diffusing, circling with, and or recycling with the cutter 32 back into the void 12 and from creating dust in general. In the embodiment shown, the cutter 32 actually assists in moving the stream of debris around and into the cubic feet per second airflow suction of the vacuum system 34.

The blade 33 of the cutter 32 must have a width and diameter sufficient to cut a void 12 having a width and depth as follows. The width of the void 12 should be narrow, i.e., as narrow as possible to fit cable(s) or duct(s) 14 within the void 12. This allows vehicles to traverse the void 12 while the underground cable line is being constructed at the installation site. One example of an acceptable width is 1.75 cm (¹¹⁄₁₆ths of an inch). For purposes of limiting the changing of the cutter 32 blade 33 it may be useful to offer standard width voids/channels 12, and normally the width of the void 12 will be selected from either a range of 1.9 cm to 2.54 cm (0.75 in.-1 in. wide), or a 3.175 cm (1.25 in.) wide void. However, the width of the void 12 is not limited to these certain standard ranges. The width of the void 12 should be less than about 3.8 cm (1.5 inches) in any case and preferably less than or equal to 3.175 cm (1.25 in.). It has been discovered that if the width of the void 12 is too large, the asphalt will not properly bridge making the disclosed technique ineffective. On the lower end, voids 12 having a width of 1.27 cm (0.5 in.) have been successfully implemented, but 1.27 cm (0.5 in.) is not necessarily limiting at the lower end.

The void 12 must be greater than 10.16 cm (four inches) deep into the covering surface 10. Presently the preferred depth of the void 12 is 30.48 cm (twelve inches) deep. This avoids the penetration of existing utility lines (and further thereby speeds the permitting process). Excessive depth of the channel may inhibit evacuation of the cuttings or penetrate to undesirable areas but otherwise the depth of void 12 is not limited.

As described above the evacuating step pertains to the removal from the void 12 of any cuttings, etc. in the stream of debris 18 resulting from the cutting of the existing surface 10. Vacuuming simultaneously or instantaneously with the cutting of the void 12 is critical or quite advantageous to the effectiveness of the technology. By suctioning while cutting less dust is created, the action of the moving volume of air cools the cutting blade 33, removes materials that could create greater friction on the spinning blade 33, and creates a void 12 free of loose debris/cuttings. Vacuuming is one example of a procedure to be used for evacuating.

One embodiment of a machine 30 which is acceptable for use for carrying out the steps of cutting and evacuating is commercially available from DITCHWITCH of Perry, Okla., USA.

The cable(s) (cable, ducts and/or conduits) 14 must be laid or applied into the void 12. This may be performed by hand or machine (e.g. by machine 30). The cable(s) 14 are preferably placed into the bottom of the void 12. More than one cable 14 may be placed in the void 12. By way of example, ten to twelve small cables 14 each of which run to individual residences 40 may be placed in the void 12 together with another main cable 14a. Each cable 14 may contain, for example, one-hundred and forty-four fibers.

A composition 16 is flowed into the void 12 and over the cable(s) 14. Generally, the composition must be a flowable composition 16 and non-shrinking upon drying. The composition 16 fills a bottom portion of the void 12 and bonds or encases the cable(s) 14. The composition 16 is preferably a plaster, grout, or mortar substance.

For flowing and encasing it is currently preferable to flow a composition 16 in the form of a grout into the void 12 and over the cable(s) 14. To apply, the operator will ensure the duct 44 is held down into the void 12. Next, the grout is pumped of poured into the void 12 using, for example, a traditional grouting machine 42 having a pump 43 so that it will flow through the duct 44 and into the void 12. Preferably the operator will not fill the void 12 with the composition 16 up to the top level of the "covering surface" 10.

In describing the composition 16, by referring to it as "flowing" or "flowable", this means the composition 16 is viscid (i.e. has a sticky and fluid consistency) yet having a viscosity that does not prevent it from flowing into the void 12 on top of, around and under (i.e. surrounding) the cable(s) 14. The composition 16 flows under the cable(s) 14 and the cable(s) 14 could even experience some rise as the composition 16 flows around that cable(s) 14 depending upon specific gravity of the cable(s) 14 relative to the composition 16. Due to the flowability, no air-bubbles or spaces are created in the filled portion of the void 12 below the top surface 17 of the composition 16.

In describing the composition 16, by referring to it as "non-shrinking", this means the composition 16 is non-compressible, non-expandable, with no contraction. By way of example, the composition 16 should shrink less than one percent upon drying at ambient temperatures. As the composition 16 dries, no air-bubbles or spaces are created in the filled portion of the void 12 below the top surface 17 of the composition 16. There is no requirement to tamp the composition 16.

The composition 16 undergoes rigidification or solidification upon drying or setting. Upon drying, the cable(s) 14 are encased within the composition 16 within the void 12.

The composition 16 should be fast drying. The composition 16 should begin to rigidify within the first hour allowing the topping material 20 to be applied within approximately three to twelve hours after the composition 16 has been pumped or poured into the void 12.

The dried, rigidified composition 16 is impermeable meaning its hydraulic permeability is less than 0.0000001 cm/s. It has been discovered that groundwater does not negatively affect the integrity of the composition once it is rigidified within the void 12.

The currently preferred composition 16 is a grout sold under the name SUPERGROUT, but other sufficiently flowable, non-shrinking materials may be implemented into the respective embodiment(s) of the technology discussed herein. SUPERGROUT is commercially available via the owner of domain name "supergroutproducts.com" or from MTsupergrout.com of Saginaw, Mich. In preparation, the grout should be fluid when mixed with water. Blend, for example, nineteen liters (five gallons) of potable water per seventy pound bag of SUPERGROUT. The grout sets in four hours, and sets as a rigid body. Such grout may be topped off with a topping material 20 within one hour of pumping or pouring.

The composition 16 and the remaining top portion of the void 12 should be filled with a topping material 20 (e.g. blacktop) to cover and seal the composition 16 and the void 12. The topping material 20 preferably adheres to the composition 16. Preferably the topping material 20 is aesthetically invisible to the untrained eye.

It may be preferable to add or blend aggregate into the topping material 20 prior to its application. One having ordinary skill in the art knows how to apply such a topping material 20 which may, for example, be blacktop, asphalt or bitumen heated to 177° centigrade (350° Fahrenheit), and then applied or flowed into the remainder portion of the void 12.

A currently preferred topping material 20 (blacktop or asphalt) is a mastic repair material commercially available from (with specifications as provided by) Deery American Corporation, such as that, for example, sold under the brand name DEERY LEVEL & GO repair mastic or the like. Then, aggregate may be mixed in prior to application.

An operator having ordinary skill in the art may desire to cut a bend or curve when cutting a void 12. The operator may for example achieve cornering with a 12.2 meter (forty ft.) bending radius, or may make two cuts intersecting at ninety degrees, for example, to form a corner.

The various embodiments disclosed may be used with dirt roads or a soil surface as the technology is not necessarily limited to use on asphalt or other hard road surfaces.

After construction is completed and in the event that future road repairs or the like are needed, the applicable surface may be worked, planed, milled and/or removed without damage to the integrity of the cable(s) 14 and normally without damage to the integrity of the rigidified composition 16.

What is claimed is:

1. A method for constructing an underground cable line in-situ in an existing covering surface comprising a first material selected from a group consisting of pavement, paving, concrete, asphalt, blacktop, cobblestone and brick, the method comprising:
   A) cutting the existing covering surface, via a portable cutting machine having a plurality of wheels, in only one pass by a distance more than a few centimeters as the plurality of wheels of the portable cutting machine advance along the existing covering surface, to create a void in the existing covering surface and thereby creating a stream of debris having a momentum in an upward direction from the existing covering surface;
   B) concurrently with A), directly suctioning the stream of debris from at least the void, through at least one duct coupled to an inlet shroud of the portable cutting machine that overlaps the stream of debris, so as to substantially prevent the stream of debris from diffusing or recycling back into the void, wherein the at least one duct is positioned on the inlet shroud adjacent to at least some of the stream of debris having the momentum in the upward direction from the existing covering surface;
   C) laying a cable into the void;
   D) pumping or pouring a flowable composition into a portion of the void so as to encase the cable; and
   E) applying a topping material to a remaining portion of the void,
   wherein:
   in A), the void has a width that allows vehicles to traverse the void while the underground cable line is being constructed;
   in D), the flowable composition undergoes rigidification or solidification and is substantially impermeable; and
   in E) the topping material is configured to adhere to the flowable composition.

2. The method of claim 1, wherein in A), the distance is at least 45.72 meters.

3. The method of claim 1, wherein B) further comprises: suctioning the stream of debris to a portable vacuum system mounted to a vehicle.

4. The method of claim 3, wherein B) further comprises: suctioning the stream of debris through the at least one duct coupled to the inlet shroud of the portable cutting machine and the portable vacuum system mounted to the vehicle.

5. The method of claim 1, wherein A) comprises cutting the existing covering surface to create the void such that the width is between 1.27 cm and 3.8 cm.

6. A method for constructing an underground cable line in-situ in an existing covering surface comprising a first material selected from a group consisting of pavement, paving, concrete, asphalt, blacktop, cobblestone and brick, the method comprising:
   A) cutting the existing covering surface, in only one pass by a distance more than a few centimeters, to create a void in the existing covering surface and thereby creating a stream of debris having a momentum in an upward direction from the existing covering surface;
   B) concurrently with A), directly suctioning the stream of debris from at least the void, through at least one duct coupled to an inlet shroud that overlaps the stream of debris, so as to substantially prevent the stream of debris from diffusing or recycling back into the void, wherein the at least one duct is positioned on the inlet shroud adjacent to at least some of the stream of debris having the momentum in the upward direction from the existing covering surface;
   C) laying a cable into the void;
   D) pumping or pouring a flowable composition into a portion of the void so as to encase the cable; and
   E) applying a topping material to a remaining portion of the void,
   wherein:
   in A), the void has a width that allows vehicles to traverse the void while the underground cable line is being constructed;
   in D), the flowable composition undergoes rigidification or solidification and is substantially impermeable; and
   in E) the topping material is configured to adhere to the flowable composition,
   wherein in A), the distance is at least 45.72 meter.

7. The method of claim 6, wherein A) comprises cutting the existing covering surface to create the void such that the width is between 1.27 cm and 3.8 cm.

8. A method for constructing an underground cable line in-situ in an existing covering surface comprising a first material selected from a group consisting of pavement, paving, concrete, asphalt, blacktop, cobblestone and brick, the method comprising:
   A) cutting the existing covering surface, in only one pass by a distance more than a few centimeters, to create a void in the existing covering surface and thereby creating a stream of debris having a momentum in an upward direction from the existing covering surface;

B) concurrently with A), directly suctioning the stream of debris from at least the void, through at least one duct coupled to an inlet shroud that overlaps the stream of debris, so as to substantially prevent the stream of debris from diffusing or recycling back into the void, wherein the at least one duct is positioned on the inlet shroud adjacent to at least some of the stream of debris having the momentum in the upward direction from the existing covering surface;

C) laying a cable into the void;

D) pumping or pouring a flowable composition into a portion of the void so as to encase the cable; and E) applying a topping material to a remaining portion of the void, wherein:

in A), the void has a width that allows vehicles to traverse the void while the underground cable line is being constructed;

in D), the flowable composition undergoes rigidification or solidification and is substantially impermeable; and in E) the topping material is configured to adhere to the flowable composition, wherein A) comprises cutting the existing covering surface to create the void such that the width is between 1.27 cm and 3.8 cm.

9. The method of claim 8, wherein A) comprises cutting the existing covering surface to create the void to have a depth of at least 10.16 cm.

10. The method of claim 8, wherein:
the existing covering surface is disposed over a subsurface below the existing covering surface;
the subsurface comprises a second material different from the first material; and
A) comprises cutting the existing covering surface so as to create the void through the existing covering surface and into the subsurface.

11. The method of claim 10, wherein A) comprises cutting the existing covering surface to create the void to have a depth of at least 10.16 cm.

12. The method of claim 8, wherein:
A) comprises cutting the existing covering surface with a circular blade of a portable cutting machine that advances in a first direction of travel along the existing covering surface to create the void;
the circular blade includes a plurality of teeth; and
the circular blade rotates such that some of the plurality of teeth on a front most portion of the circular blade relative to the first direction of travel move from within the existing covering surface to outside of the existing covering surface as the void is created.

13. The method of claim 12, wherein in A), the circular blade sweeps at least some of the stream of debris out of the void and having the momentum in the upward direction from the existing covering surface concurrently with creating the void.

14. The method of claim 13, wherein B) further comprises:
suctioning the stream of debris through the at least one duct coupled to the inlet shroud of the portable cutting machine, wherein the at least one duct is positioned on the inlet shroud adjacent to the at least some of the stream of debris swept by the circular blade in the upward direction out of the void.

15. A method for constructing an underground cable line in-situ in an existing covering surface, the method comprising:

A) cutting the existing covering surface via a portable cutting machine having a plurality of wheels, as the plurality of wheels of the portable cutting machine advance along the existing covering surface, to create a void in the existing covering surface and thereby creating a volume of debris;

B) vacuuming the volume of debris from at least the void;

C) laying a cable into the void;

D) pumping or pouring a flowable composition into a portion of the void so as to encase the cable; and E) applying a topping material to a remaining portion of the void, wherein:

B) further comprises:
vacuuming the volume of debris from at least the void to a portable vacuum system mounted to a vehicle; and
vacuuming the volume of debris through at least one duct coupled to an inlet shroud of the portable cutting machine and the portable vacuum system mounted to the vehicle; and the at least one duct is positioned on the inlet shroud adjacent to at least some of the volume of debris swept in an upward direction out of the void by the portable cutting machine in A).

16. The method of claim 15, wherein A) is carried out continuously in one and only one swath from a starting point A to a finishing point B over a distance of at least 45.72 meters.

17. The method of claim 16, wherein:
the existing covering surface is disposed over a subsurface below the existing covering surface; and
A) comprises cutting the existing covering surface so as to create the void through the existing covering surface and into the subsurface.

18. A method for laying and protecting an underground cable, a duct, and/or a conduit within an existing covering surface, the method comprising:

A) cutting the existing covering surface via a portable cutting machine having a plurality of wheels, in a single pass over a distance of at least 150 feet as the plurality of wheels of the portable cutting machine advance along the existing covering surface, to create a narrow channel in the existing covering surface, wherein a width of the narrow channel allows vehicles to traverse the narrow channel;

B) vacuuming a volume of debris from the narrow channel through at least one duct coupled to an inlet shroud of the portable cutting machine, wherein the at least one duct is positioned on the inlet shroud adjacent to at least some of the volume of debris being vacuumed;

C) laying the underground cable, the duct, and/or the conduit into the narrow channel; and D) filling at least a first portion of the narrow channel with a first material to protect the underground cable, the duct, and/or the conduit in the narrow channel.

19. The method of claim 18, wherein in D), the first material is a flowable composition that undergoes rigidification or solidification and is substantially impermeable upon drying.

20. The method of claim 18, further comprising:

E) filling at least a second portion of the narrow channel with a second material after filling at least the first portion of the narrow channel with the first material.

21. The method of claim 18, wherein A) comprises cutting the narrow channel in the existing covering surface as a uniform cut that does not disturb the existing covering surface as with multiple passes.

22. The method of claim 18, wherein the existing covering surface is selected from a group consisting of pavement, paving, concrete, asphalt, blacktop, cobblestone and brick.

23. The method of claim 18, wherein:
  A) comprises cutting the existing covering surface with a circular blade of the portable cutting machine that advances in a first direction of travel along the existing covering surface and over the distance of at least 150 feet to create the narrow channel;
  the circular blade includes a plurality of teeth; and
  the circular blade rotates about an axis substantially perpendicular to the narrow channel such that some of the plurality of teeth on a front most portion of the circular blade relative to the first direction of travel move from within the existing covering surface to outside of the existing covering surface.

24. The method of claim 23, wherein in A), the circular blade sweeps at least some of the volume of debris out of the narrow channel concurrently with creating the narrow channel.

25. The method of claim 24, wherein B) further comprises:
  vacuuming the volume of debris through the at least one duct coupled to the inlet shroud of the portable cutting machine, wherein the at least one duct is positioned on the inlet shroud adjacent to at least some of the volume of debris swept by the circular blade in an upward direction out of the narrow channel.

26. The method of claim 18, wherein B) further comprises:
  vacuuming the volume of debris from the narrow channel to a portable vacuum system mounted to a vehicle.

27. The method of claim 26, wherein B) further comprises:
  vacuuming the volume of debris through the at least one duct coupled to an inlet shroud of the portable cutting machine and the portable vacuum system mounted to the vehicle.

* * * * *